United States Patent
Zeltzer

(10) Patent No.: US 8,958,919 B2
(45) Date of Patent: Feb. 17, 2015

(54) SYSTEM AND METHOD ENABLING SENSORLESS ACTUATOR

(71) Applicant: David Zeltzer, Beer-Yakov (IL)

(72) Inventor: David Zeltzer, Beer-Yakov (IL)

(*) Notice: Subject to any disclaimer, the term of this patent is extended or adjusted under 35 U.S.C. 154(b) by 238 days.

(21) Appl. No.: 13/711,409

(22) Filed: Dec. 11, 2012

(65) Prior Publication Data

US 2014/0005833 A1 Jan. 2, 2014

Related U.S. Application Data

(63) Continuation of application No. 12/191,237, filed on Aug. 13, 2008, now Pat. No. 8,332,071.

(60) Provisional application No. 60/965,296, filed on Aug. 20, 2007.

(51) Int. Cl.
| | |
|---|---|
| *G01M 1/38* | (2006.01) |
| *G05B 13/00* | (2006.01) |
| *G05D 23/00* | (2006.01) |
| *F16H 61/00* | (2006.01) |
| *G05B 19/401* | (2006.01) |

(52) U.S. Cl.
CPC ............. *F16H 61/00* (2013.01); *G05B 19/401* (2013.01); *G05B 2219/37008* (2013.01); *G05B 2219/50139* (2013.01)
USPC ...................... 700/275; 700/1; 701/1; 701/51

(58) Field of Classification Search
USPC .................. 701/1, 51–66; 700/1, 275, 29–34, 700/44–46, 63
See application file for complete search history.

(56) References Cited

U.S. PATENT DOCUMENTS

| | | |
|---|---|---|
| 4,891,764 A | 1/1990 | McIntosh |
| 4,984,988 A | 1/1991 | Mizushina et al. |
| 5,533,380 A | 7/1996 | Ferris |
| 5,847,530 A | 12/1998 | Hill |
| 6,114,924 A | 11/2000 | Dowling et al. |
| 7,099,136 B2 | 8/2006 | Seale et al. |
| 7,135,830 B2 | 11/2006 | El-Ibiary |
| 7,687,727 B2 | 3/2010 | Turner |
| 2004/0082857 A1 | 4/2004 | Schnenberger et al. |
| 2004/0099784 A1 | 5/2004 | Kienholtz |
| 2004/0211200 A1 | 10/2004 | McMillan et al. |
| 2005/0031137 A1 | 2/2005 | Browning et al. |
| 2007/0210733 A1 | 9/2007 | Du et al. |

(Continued)

OTHER PUBLICATIONS

EPO Communication pursuant to Article 94(3) EPC issued May 2, 2013 for EP Application No. 08789813.6.

(Continued)

*Primary Examiner* — Bhavesh V Amin
(74) *Attorney, Agent, or Firm* — Pillsbury Winthrop Shaw Pittman LLP

(57) ABSTRACT

An actuator having a two-parameter energy converter is coupled to a transducer and is driven by a controller. Prior to assembly and operation of the actuator, a calibration procedure is performed. The calibration procedure, together with the unique controller, enables accurate control of the output parameters of the actuator. In one example, the parameters are rate and force, and the calibration and controller enable accurate control of the rate and force at the output of the actuator by measuring only the rate at the output of the energy converter. Consequently, no sensors are needed at the output of the actuator, i.e., at the output of the transducer, where the load is applied.

16 Claims, 13 Drawing Sheets

(56) References Cited

U.S. PATENT DOCUMENTS

2009/0015188 A1     1/2009    Sasaki et al.
2010/0315031 A1     12/2010   Jensen

OTHER PUBLICATIONS

European Search Report Issued Jul. 20, 2012 for EP Application No. 08789813.6.

International Search Report for PCT Application No. PCT/IL2008/001141 dated Jan. 5, 2009.

Aghili F., et al., "A Modular and High-Precision Motion Control System with an Integrated Motor," IEEE/ASME Transactions on Mechatronics, vol. 12, No. 3, Jun. 2007, pp. 31-329.

Chuang, C.-W. et al., "Applying experienced self-tuning PID control to position control of slider crank mechanisms," International Symposium on Power Electronics, Electrical Drives, Automation and Motion, 2006. SPEEDAM 2006, Jan. 1, 2006, pp. 652-657.

IEEE Standard Test Procedure for polyphase induction motors and generators, Nov. 4, 2004, IEEE Power Engineering Society, Revision of IEE Std 112-1996.

Hamel W.R., et al., "Design and testing of a prototype transmission-based robot servoactuator," Proceedings of the 2004 IEEE International Conference on Robotics and Automation, New Orleans, LA, Apr. 2004; pp. 3628-3633.

Amstrong-Helouvry, B. et al., "A Survey of Models, Analysis Tools and Compensation Methods for the Control of Machines with Friction", Automatica, vol. 30, No. 7, Jan. 1994, pp. 1083-1138 (available at http://www.bu.edu/biorobotics/publications/94_Survey_friction.pdf).

Dohring, M.E., et al., "A load-dependent transmission friction model: theory and experiments," Proceedings of the International Conference on Robotics and Automation, IEEE Comp. Soc. Press, vol. 3, Conf. 10, May 2, 1993, pp. 430-436.

Umans, S.D., "AC induction motor efficiency," EEIC/ICWA Expo, Proc of the 19$^{th}$ Conf; Sep. 25-28, 1989, Chicago, IL, pp. 99-107.

Caro, J. et al., "A Microprocessor-Based Position Control of a DC Drive Taking into Account the Load's Variations," IEEE transactions on industry applications, vol. IA-22, No. 6, Nov. 1, 1986, pp. 982-988.

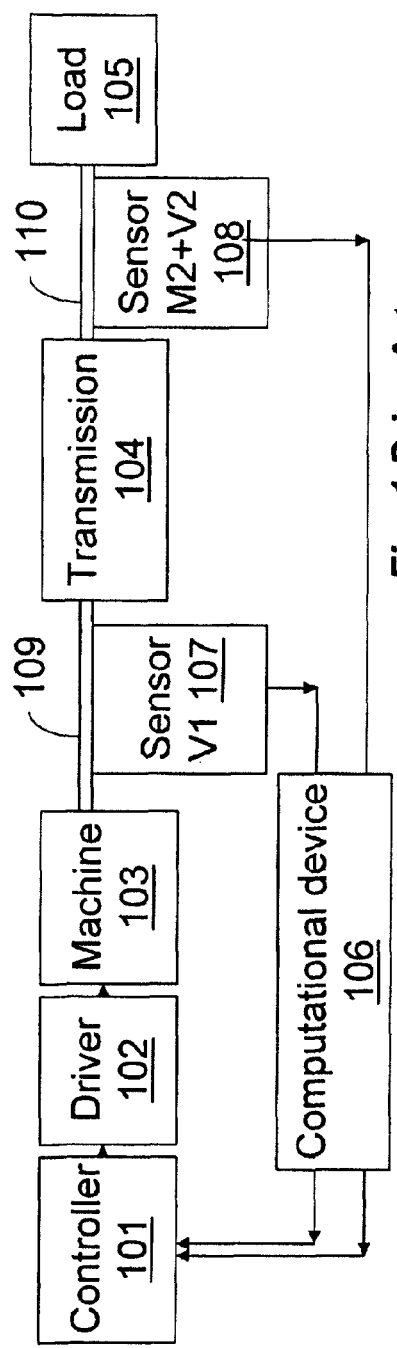
*Fig. 1 Prior Art*
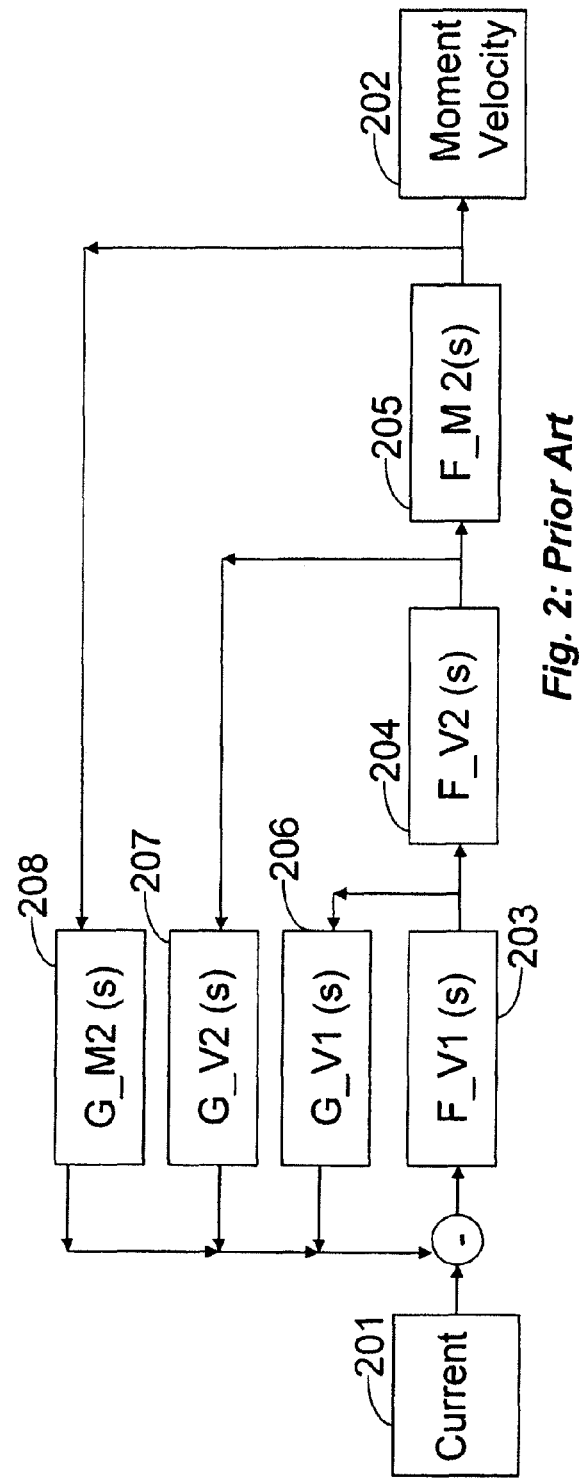
*Fig. 2: Prior Art*

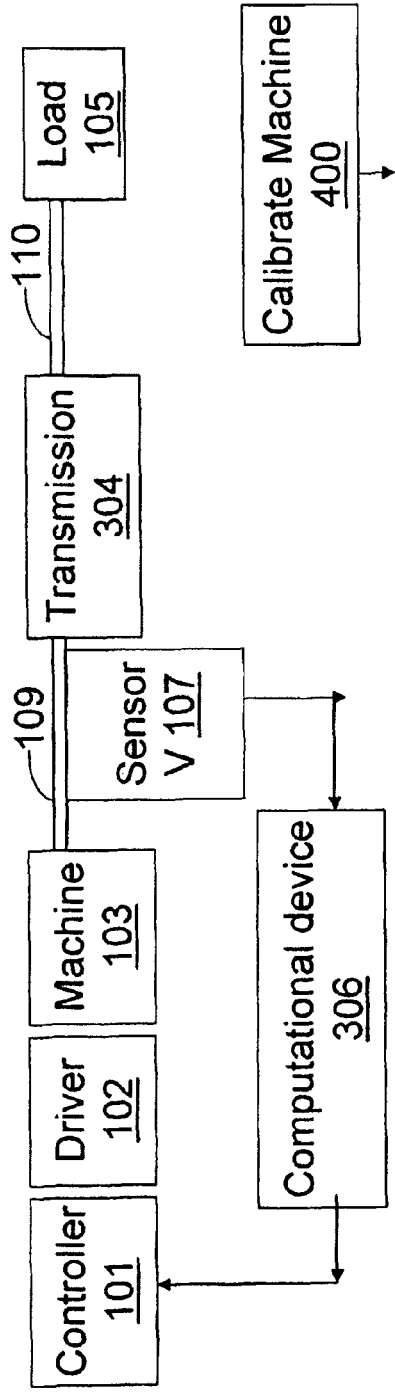
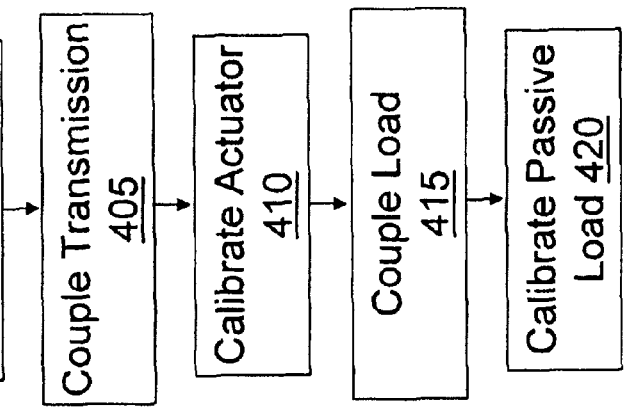
*Fig 4A*
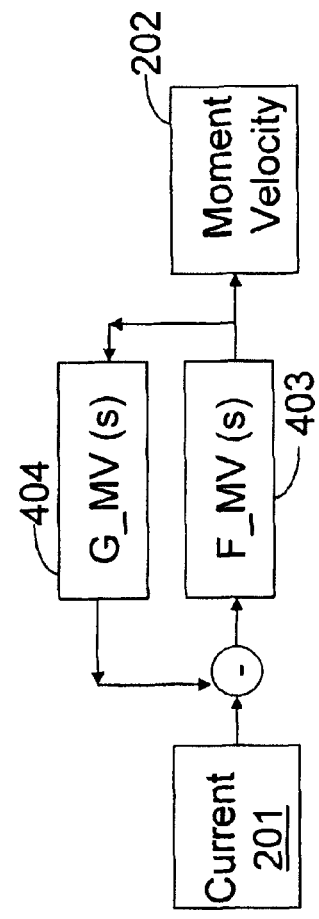
*Fig 3*
*Fig 4*

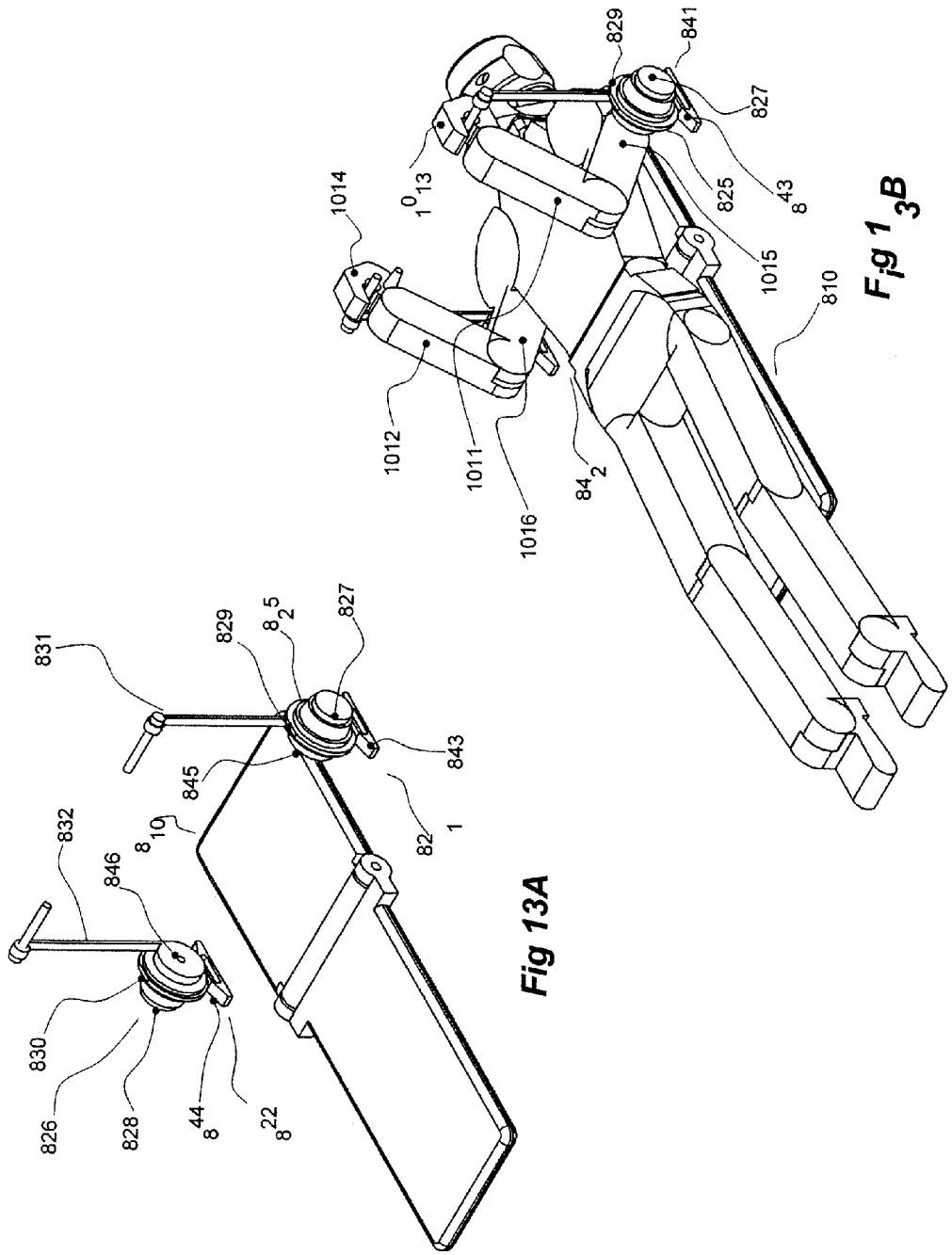

SYSTEM AND METHOD ENABLING SENSORLESS ACTUATOR

CROSS-REFERENCE TO RELATED APPLICATIONS

This application is a continuation of U.S. application Ser. No. 12/191,237, filed Aug. 13, 2008, and issued as U.S. Pat. No. 8,332,071, which claims priority to U.S. Provisional Application No. 60/965,296, filed Aug. 20, 2007, the contents of which are incorporated herein by reference in their entirety.

BACKGROUND

1. Field of the Invention

The present invention relates generally to controlled systems with a controlled machine, transmission and load.

2. Description of the Related Art

Control systems are used in various arts, such as mechanical system, electrical systems, hydraulic systems, etc. For illustration, two examples of such systems are: a torsion system with controlled electric machine, reduction gear and angle transmission shaft for controlling robotic arm, and a pneumatic/hydraulic system with controlled electric pump, reduction valves system and a tube for controlling the robotic arm, etc. In fact, control systems may also be implemented over a machine-human arrangement, e.g., a human running on a treadmill, with the treadmill speed and elevation being controlled according to efforts exerted by the human. The load can be both passive (e.g., a drill in CNC device) and active (e.g., a human on a treadmill).

In this respect, the term "machine" is generically used herein to describe an energy exchanger, e.g., a controlled device which can be used both as a motor and/or as a generator. The motor uses current to produce velocity and moment, while generator uses velocity and moment to produce current. Such energy converter can be described as two-parameter energy exchangers. So, while the motor example uses velocity and moment, a fluid system, for example, may use flow rate and pressure. Importantly, the energy exchangers relevant to this invention are those that can be characterized by two parameters. The term "current" in this respect, is a measure of some kind of energy flow, e.g., electric energy, chemical energy, etc.

The term transmission is used herein as a generic term applied to a transducer or a systems for transducing the energy produced by the energy exchanger. The transmission transduces a combination of values of the two parameters as output by the energy exchanger into another combination of values, which may or may not be the same as output by the energy exchanger. For example, the transmission may transduce some combination of velocity and moment into a different combination of velocity and moment. Transmission systems generally perform multiple functions, e.g., provide more moment at the expense of velocity or vice-versa via reduction gear, blocks system, valves, etc., and/or alter the geometry from lateral motion into rotation, rotation into lateral motion, change the angle of rotation, etc. The term "actuator," on the other hand, refers to the coupled machine-transmission arrangement, with the attendant control-drive mechanism.

To illustrate, the description proceeds with respect to electrical systems having an actuator comprising a motor shaft coupled to a transmission; however, the concept can be applied to other actuator systems as well. Control systems typically control the machine via a sensor positioned on a shaft between the machine and transmission system. Since in many applications it is crucial to control the moment and velocity applied to the load (i.e., moment and velocity on the transmission shaft), a constant mathematical model of the transmission is used and control is implemented on the machine shaft according to the model. However, performing control on the machine shaft poses certain limitations, including: the inconsistence of a physical transmission system with its model; time delays of the transmission system; dynamic changes in the transmission system and the load are inseparable; and, malfunctions are difficult to discover and correct.

To solve these limitations, an additional control is typically established based on a sensor positioned on the transmission shaft. The resulting control system is complex and hard to control due to the multitude of sensor inputs. Multiple sensor implementation also has limitations, including: price of the sensors; expensive control computations; slow control speed due to system complexity; hard to take corrective steps in case of malfunction due to system complexity. Moreover, is some situations there is a need to control the moment and/or velocity at the load, i.e., at the transmission shaft, but the conditions or design of the system do not enable placing a sensor on the transmission shaft.

FIG. 1 presents a typical design of a prior art system based on multiple sensors. Block 101, the controller, generates a signal that controls the driver 102. The signal issued by the controller 101 corresponds to a digital command from computational device 106. Driver 102 translates the signal of the controller 101 into a current that drives the machine (e.g., electrical motor, hydraulic pump, etc.) 103. Machine 103 generates velocity and moment at its output, as a result of the current it receives from the driver 102. Transmission 104 is coupled to the machine 103 via coupling 109, in this example, the transmission is connected to the motor via motor shaft 109. The transmission transduces the velocity and moment of the machine shaft 109 into different velocity and moment on the transmission shaft 110. Load 105 is subjected to the velocity and moment it receives through the transmission shaft 110. Generally, machine shaft 109 provides mechanical, hydraulic, etc., coupling between the machine 103 and the transmission 104, while transmission shaft 110 provides mechanical, hydraulic, etc., coupling between the transmission 104 and the load 105.

Computational device 106 receives its data from the sensors 107 and 108, executes calibration and control algorithms, and sends digital command to the controller 101. Velocity sensor 107 is positioned on the machine shaft 109. Sensor 107 gathers data regarding the velocity of the machine shaft 109 and sends information to the computational device 106. Sensor 108 is positioned on the transmission shaft 110, and is especially beneficial when the transmission ratio is changed significantly during operation.

FIG. 2 presents a typical design of a prior art control loop. The current 201 is the input of the control loop. The velocity and the moment on the load shaft 202 are the output of the control loop. The transfer function F_V1($s$) in block 203, models the velocity at the output of the machine shaft 109 as a function of the current 201. The velocity sensor 107 measures the actual velocity at the output of the machine shaft, which may differ from the velocity modeled by F_V1. The transfer function F_V2($s$) in block 204, models the velocity at the output of the transmission shaft 110 as a function of the velocity of the machine shaft 109. The velocity and moment sensor 108 measures the actual velocity at the output of the transmission shaft, which may differ from the velocity modeled by F_V2. The transfer function F_M2($s$) in block 205, models the moment at the output of the transmission shaft 110 as a function of the velocity of the transmission shaft 110. The velocity and moment sensor 108 measures the actual moment at the output of the transmission shaft, which may differ from the moment modeled by F_M2.

The control loop is closed via computation of three transfer functions, in order to reconcile the modeled and the actually measured parameters. Each of these functions is complex and requires extensive computations. The transfer function G_V1 (s) in block 206 closes the loop between the velocity at the output of the machine shaft 109 and the current 201. The transfer function G_V2(s) in block 207 closes the loop between the velocity at the output of the transmission shaft 110 and the current 201. The transfer function G_M3(s) in block 208 closes the loop between the moment at the output of the transmission shaft 110 and the current 201.

Generally, computational device 106 executes complex calculations to provide feedback that incorporates velocity measurement of sensor 107, and moment and velocity measurements of sensor 108. This leads to higher costs and lower reliability and response-time of the control system. Notably, since the control system attempts to correct for three independently measured parameters, the response time is sufficiently large that secondary and higher order effects become significant and makes precise control more difficult. Accordingly, it would be beneficial to provide a solution that enables simple and fast control, yet avoids the disadvantages associated with prior art control systems.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to aspects of the invention, a control loop is used based on a single sensor positioned on the output of the energy converter, e.g., machine shaft. Since velocity sensors are currently cheaper and more widespread than moment sensors, embodiments of the invention utilize a velocity sensor; however, it should be appreciated that other type of sensor may be used. The resulting design eliminates at least some of the above-listed limitations of the conventional control systems.

Aspects of the present invention provide an alternative and superior method for controlling the moment and velocity on the transmission shaft. The method utilizes a single sensor positioned on the machine shaft. The control loop is simple and fast, since only one sensor and current feedback loop are used. In order to figure out the properties of the transmission system and the dynamic load, a calibration procedure is performed. The resulting control algorithm easily detects and corrects malfunctions and changes in load properties.

The system presented in this invention is accurate since the moment and velocity on the load axis are calculated utilizing the inventive methods and algorithms of calibration, adaptation, prediction and verification. The price and complexity of the proposed system in its various embodiments is lower than the price and complexity of its alternatives, since there is no dedicated velocity and moment measurements on the transmission axis and no complex feedback configuration requiring complex mathematic calculation within different time-delays in dynamic regime. The resulting system has a very fast response time, so that higher order effects are not significant.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention. The drawings are intended to illustrate various features of the illustrated embodiments in a diagrammatic manner. The drawings are not intended to depict every feature of actual embodiments nor relative dimensions of the depicted elements, and are not necessarily drawn to scale.

Various other objects, features and attendant advantages of the present invention will become fully appreciated as the same become better understood when considered in conjunction with the accompanying detailed description, the appended claims, and the accompanying drawings, in which:

FIG. 1 presents a typical design of a prior art system based on multiple sensors.

FIG. 2 presents a typical design of a prior art control loop.

FIG. 3 presents a system according to an embodiment of the invention.

FIG. 4 presents a control loop according to an embodiment of the invention, while FIG. 4A illustrates a flow of a calibration process.

FIGS. 13A and 13B show main parts of a "multi-trainer" according to an embodiment of the invention.

FIG. 15A illustrates an example of a conventional electric car set-up, while

DETAILED DESCRIPTION

Figure 5:
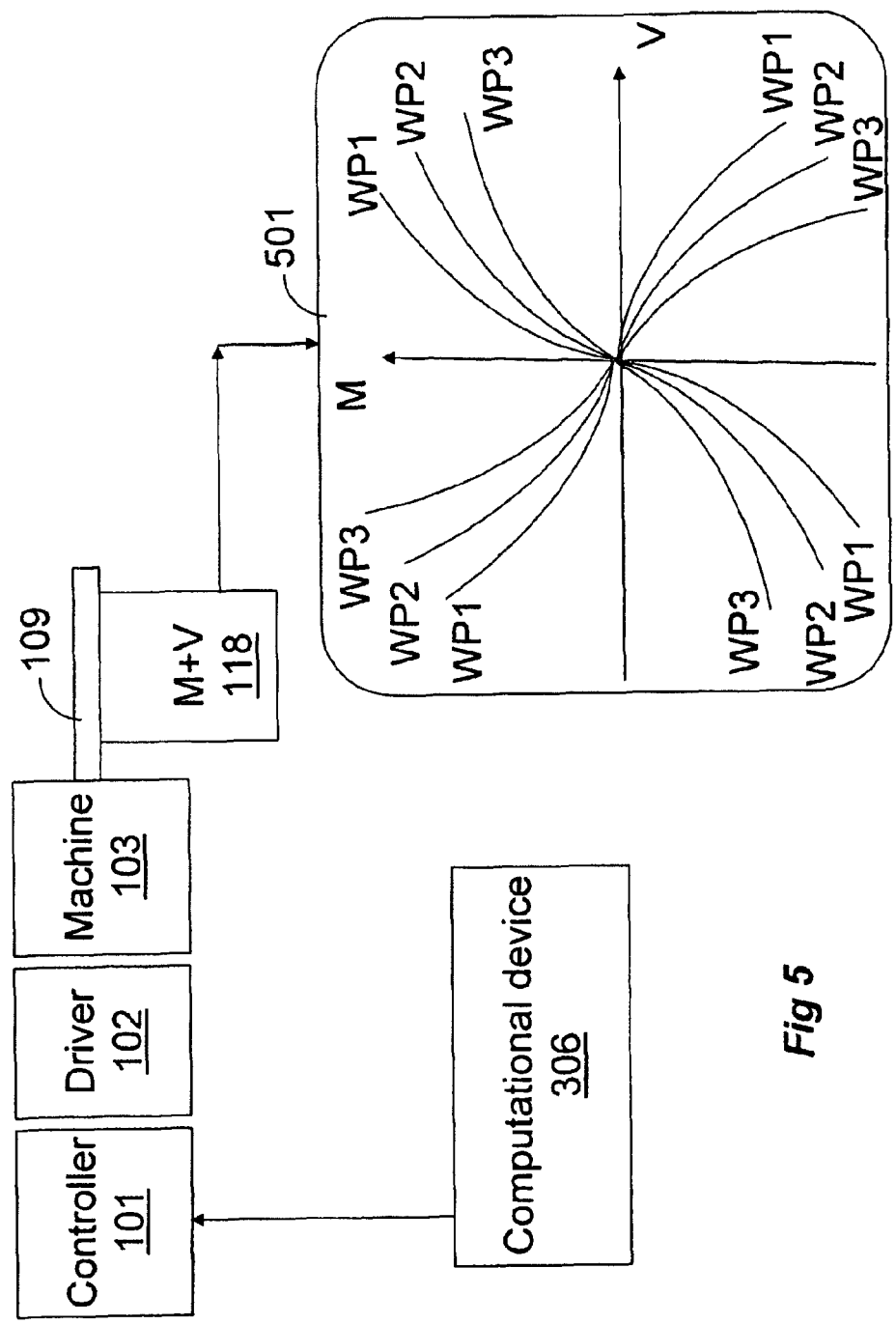
FIG. 5 presents a machine curve calibration system and method according to an embodiment of the invention.

FIG. 3 presents a typical design according to an embodiment of the invention. While the illustrated embodiment seems similar to the prior art system, in this embodiment only a single sensor is used and the computational device 306 performs very different function than the computational device 106, thus reducing system price and complexity, while increasing its response and reliability. Due to the function of the computational device 306, the control of characteristics on the transmission shaft 110 does not require the prior art sensor 108. The computational device 306 is typically a digital (but may be analog) computer, and may include one or an array of microprocessors performing computation of the control based on sensor inputs and the control process. The process performed by computational device 306 is efficient especially if the transmission 304 provides an accurate feedback regarding the load 105. Therefore, the illustrated embodiment is particularly useful for systems having transmission 304 that does not provide for slips, breaks and some other nonlinear effects while the computational device 306 is active.

FIG. 4 presents a control loop according to an embodiment of the invention. The control loop itself is very simple. The transfer function F_MV(s) in block 403, models the moment and the velocity at the output of the transmission shaft 110 as the result of the current in the input of the machine 103. The transfer function G_MV(s) in block 404 closes the control loop. The simplification of the control loop requires calibration methods different from prior art systems.

FIG. 4A illustrates a calibration process according to an embodiment of the invention. In step 400 machine calibration is performed. A machine set of curves calibration is generated once, prior to system assembly, i.e., prior to coupling a transmission to the machine. For that, high accuracy velocity and moment measurement equipment is attach directly to the machine shaft, and moment and velocity scale verification is perform with fixed control signal. This provides a set of stable and highly repeatable controlled curves that are locked and stored. This calibration step allows characterization and prediction of the machine in the control equation.

In step 405 the transmission is coupled to the machine and in step 410 an actuator (i.e., machine+transmission) calibration is performed. Velocity and moment measurement equipment is attached directly to the transmission shaft to measure moment and velocity in a number of working points. This calibration provides information relating to internal losses of the actuator and allows predicting the control loop behavior for each working point in the range of actual working points of the system. Since the sensorless actuator behavior can change over time, this procedure is performed also as periodic calibration. The values of the working points can be used to dynamically update the control model of the actuator.

In step 415 a static load is coupled to the transmission shaft and in step 420 passive load calibration is performed to enable adding loaded transmission and/or passive load characteristics into the feedback. This calibration step provides information relating to external losses of the system. The passive load is applied to the transmission by opening the active work point interface (if a load is human being, asking a man not to strain his muscles will result in passive load).

The control process itself is adaptive. The computation system uses the calibration results to calculate the derivative (typically not more than the first two derivatives) of the velocity (seldom moment) as reported by the sensor. Using the transmission with initially-known velocity ratio, the transmission moment and its derivatives are calculated. The derivatives are then normalized by target speed and moment. The active load moment is calculated from dynamic load effects.

The velocity and the moment attributed to the dynamic model are stored for statistics and improvement. For example, a man can be presented with his muscular velocity and moment along the time axis and the amount of the calories burned. Unlike other control methods, the inventive system presents accurately measured statistics without using additional sensors.

FIG. 5 presents a typical machine setup for curves calibration system, according to an embodiment of the invention. The machine curves calibration is a part of the system production process and is performed prior to coupling the machine to the transmission. The working conditions set of the machine curve is fixed separately in four application quadrants, covering both a motor and generator operations:

Quadrant 1: Positive moment and positive velocity;
Quadrant 2: Positive moment and negative velocity;
Quadrant 3: Negative moment and positive velocity;
Quadrant 4: Negative moment and negative velocity.

In each quadrant, a different set of machine curves is expected.

The machine parameters deviation set of curves 501 of moment vs. velocity is measured during the calibration stage, and does not typically change over time, i.e., it is inherent to the machine. In order to measure the machine performance, high accuracy moment and velocity external measurement equipment 118 is mounted on the output of the machine shaft 109. The control loop of computational device 306 and the coupling of machine and transmission are opened, and various constant current commands are sent by the controller to get measurement points on plot 501. Consequently, the machine parameters, i.e., moment and velocity, are recorded computational device 306 in the form of plot 501, so that they are known a-priory to system utilization. It is postulated that the correlation between these parameters is constant for each configuration of transmission 104 and load 105.

Figure 6:
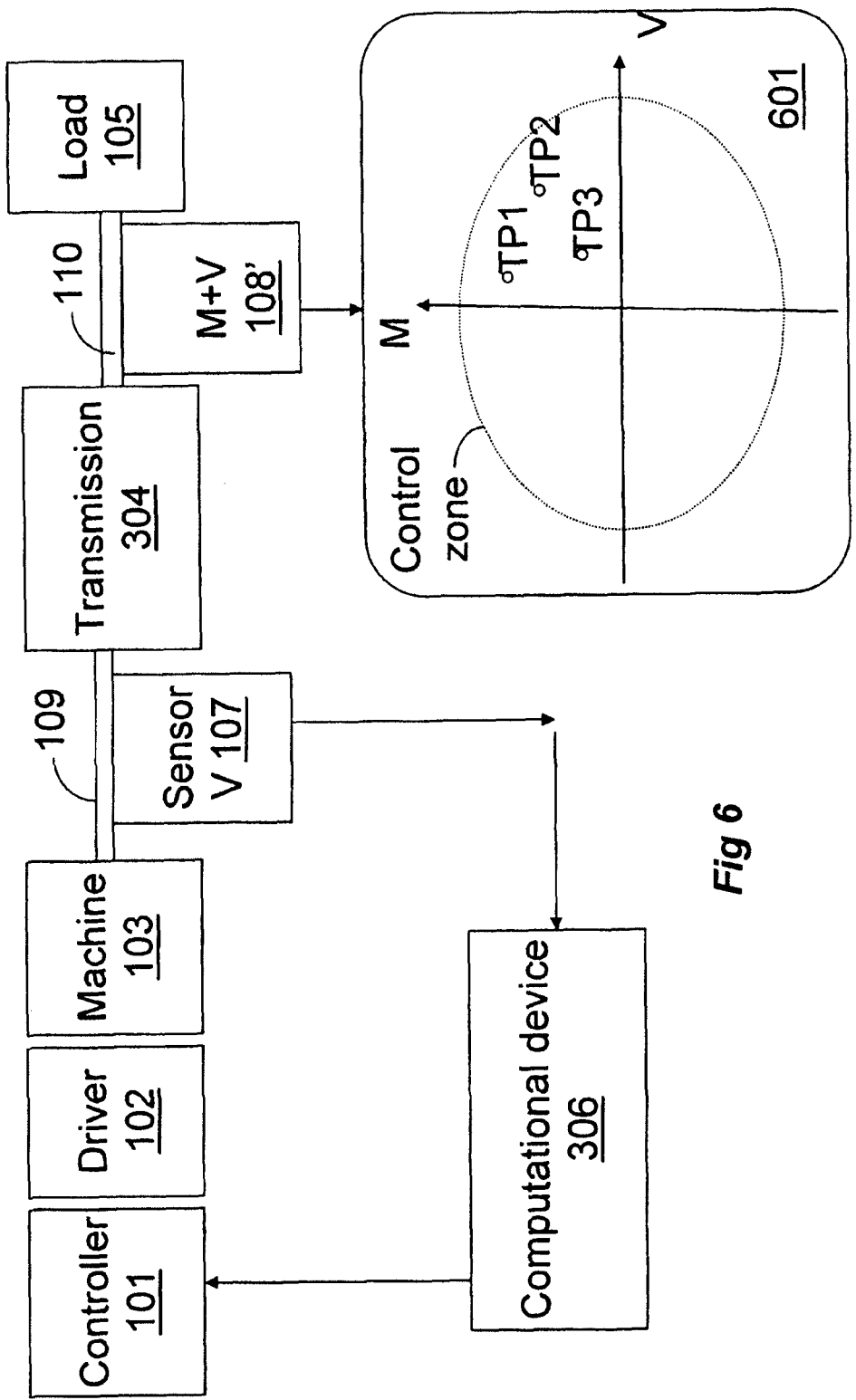
FIG. 6 presents a sensorless actuator calibration system and method according to an embodiment of the invention.

FIG. 6 illustrates a sensorless actuator calibration system according to an embodiment of the invention. The plot in box 601 shows the control zone and selected test points. The control zone of 601 is the range of velocities and moments that should be controlled in normal operation, by the design of the particular application. The tested work points 601 of moment vs. velocity within the control zone are measured during the calibration stage to provide information relating to internal losses of the actuator, and do not typically change over time. In order to measure the performance, external test equipment 108' is coupled to the output of the transmission shaft 110 to measure moment and velocity. The calibration software sends various constant current commands to get points on plot 601, per all operational modes of the sensorless actuator. Inside the control zone multiple test points are chosen and the velocity and moment calculated by computational device 306 are compared to the velocity and moment measured by external test equipment 108'. The differences are used to calibrate the control algorithm of 306.

Figure 7:
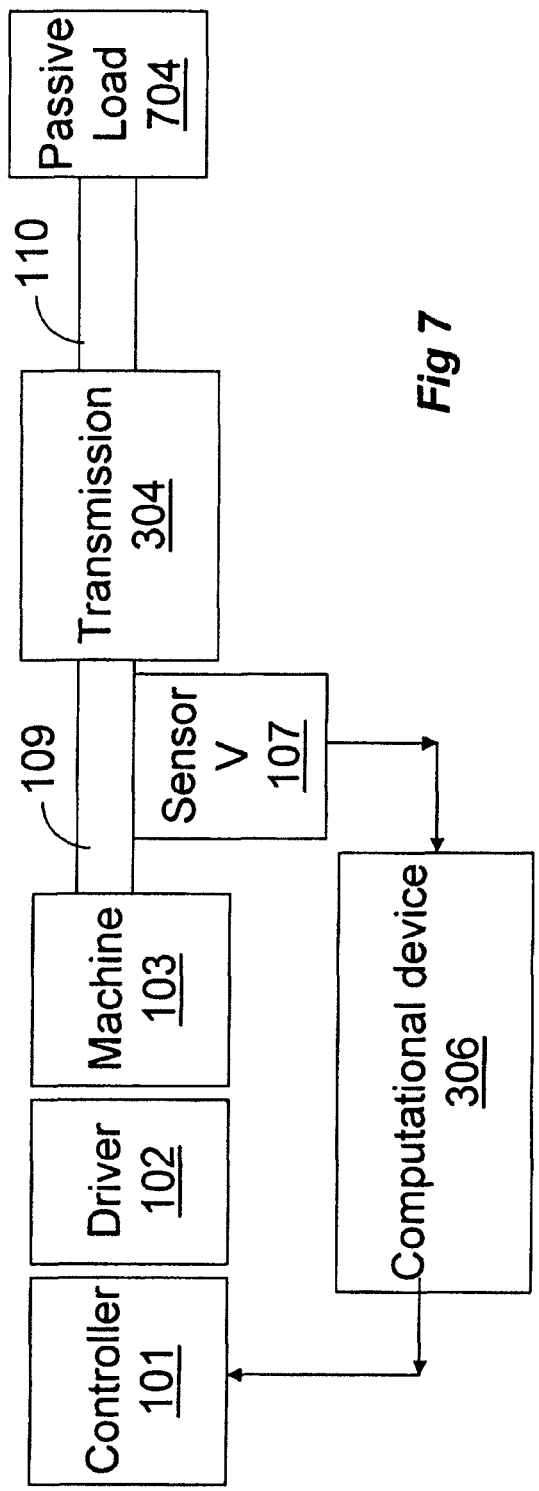
FIG. 7 presents a passive load calibration system and method according to an embodiment of the invention.

FIG. 7 illustrates a typical passive load calibration system according to an embodiment of the invention. The system is equivalent to the working system 3, except for the load 701, which, unlike the load 105, is totally passive. For example, if the load is a human, he is asked not to actively engage the mechanical interfaces. The moment at the transmission shaft 110 is set to zero (0), and different movements are simulated by applying different currents to the motor. Then, the coefficients of the algorithm in computational device 306 are varied until physical motion of the transmission stops. These coefficients are recorded and fixed for the operation phase so as to provide information relating to external losses of the actuator system. This pre-operation calibration may need to be repeated each time the actual physical load is changed.

The main static transduction ratio between the parameter, i.e. velocity, on the transmission shaft 110 and the parameter, i.e. velocity, on the machine shaft 109, is a-priori available through supplier information and/or prior measurement of similar systems. This transduction ratio is dynamically updated as the system enters actual usage. That is, the transduction ratio is taken as a contact only in the initial activation of the actuator.

Figure 8:
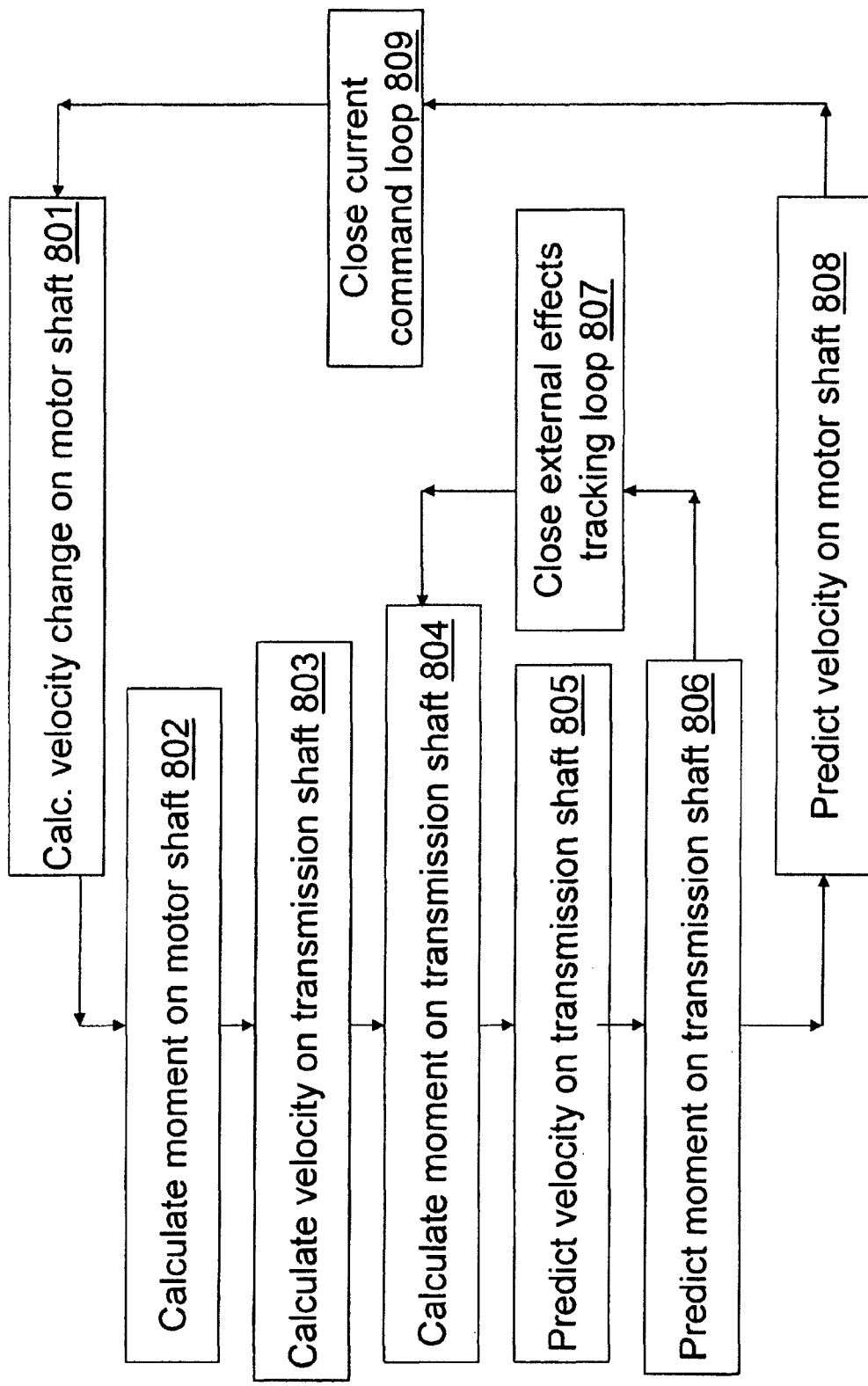
FIG. 8 presents a typical design of the proposed control algorithm according to an embodiment of the invention.

FIG. 8 illustrates an example of a control process executed in computational device 306, for the system illustrated in FIG. 3, with control loop illustrated in FIG. 4. In Step 801 the change of velocity on motor shaft $\Delta V|^{act}$ is calculated taking the currently measured velocity of sensor 107 and subtracting from it the previous velocity measurement. In Step 802 the change of moment on motor shaft $\Delta M|^{act}(\Delta V|^{act})$ is obtained using one of the constant curves measured during calibration of FIG. 5. In this respect, the notation $\Delta M|^{act}(\Delta V|^{act})$ means change of moment, $\Delta M|^{act}$ as a function of change of velocity, $\Delta V|^{act}$. It should be appreciated that the selection of the curve depends on the mode of operation of the machine. For example, one may select to operate the machine following a single curve, say curve WP3 in FIG. 5. In such operation, varying the two parameters of the energy exchanger (e.g., the motor) is performed mainly by the transmission transducing those parameters. Conversely, one may elect to control the parameter by varying the modes of operation of the machine, and fix the transmission to operate in a single transducing ratio. For example, one may operate the machine by moving among the three curves shown in FIG. 5, thereby analogizing the operation of the machine as if coupled to a three speed transmission, even when the transmission is fixed to a single transfer ratio. Of course, one may operate the actuator in any combination of machine modes and transmission ratios. In fact, using the machine modes one can use a simple 1:1 transmission ratio.

In Step 803 the change of velocity on transmission shaft $\Delta V|^{trans}(\Delta V|^{act})$ is calculated using the a priory known (in the initial stage) or updated (in subsequent stage) transmission ratio. In Step 804 the change of moment on transmission shaft is calculated using the equation:

$$\Delta M|^{trans}(\Delta V|^{trans}) = \Delta M|^{act}(\Delta V|^{trans}) + \Delta M|^{sysloss}(\Delta V|^{trans}) + \Delta M|^{exteff}(\Delta V|^{trans}),$$

where the system losses ($\Delta M|^{sysloss}$) and the external effects ($\Delta M|^{exteff}$) are known from calibration described with respect to FIGS. 6 and 7. In Step 805 the velocity on the transmission shaft $\Delta V'|^{trans}$ is predicted using prediction model of transfer function F_MV(s) of FIG. 4, based on previous results of $\Delta V|^{trans}$ and its derivatives. In Step 806 the moment on the transmission shaft $\Delta M'|^{trans}$ is predicted using the equation:

$$\Delta M'|^{trans}(\Delta V'|^{trans}) = \Delta M|^{act}(\Delta V'|^{trans}) + \Delta M|^{sysloss}(\Delta V'|^{trans}) + \Delta M|^{exteff}(\Delta V'|^{trans}).$$

In Step 807 external effects tracking loop is closed using $\Delta M'|^{trans}(\Delta V'|^{trans})$ and $\Delta M|^{trans}(\Delta V|^{trans})$ results. The difference between the predicted moment and calculated moment is attributed to external effects:

$$\Delta M|^{exteff}(\Delta V'|^{trans}) = \Delta M'|^{exteff}(\Delta V'|^{trans}) + \Delta M|^{trans}(\Delta V'|^{trans}) - \Delta M'|^{trans}(\Delta V'|^{trans})).$$

In Step 808 the velocity on motor shaft $\Delta V'|^{act}$ is predicted based on $\Delta V'|^{trans}$ and results of calibration described in FIG. 6. Step 808 is an inverse of 803, but using corrected transmission velocity. In Step 809 the current command loop $\Delta I$ is closed. The current command from computational device 306 to driver 102 results in changes of $\Delta V|^{act}$ and allows elimination of discrepancies between $\Delta V|^{act}$ and $\Delta V'|^{act}$. The target velocity $V|^{act}$ is used to calculate the desired $\Delta V|^{act}$. After completion of Step 809, Step 801 is executed again using a newly measured machine velocity, closing the control loop.

Figure 9:
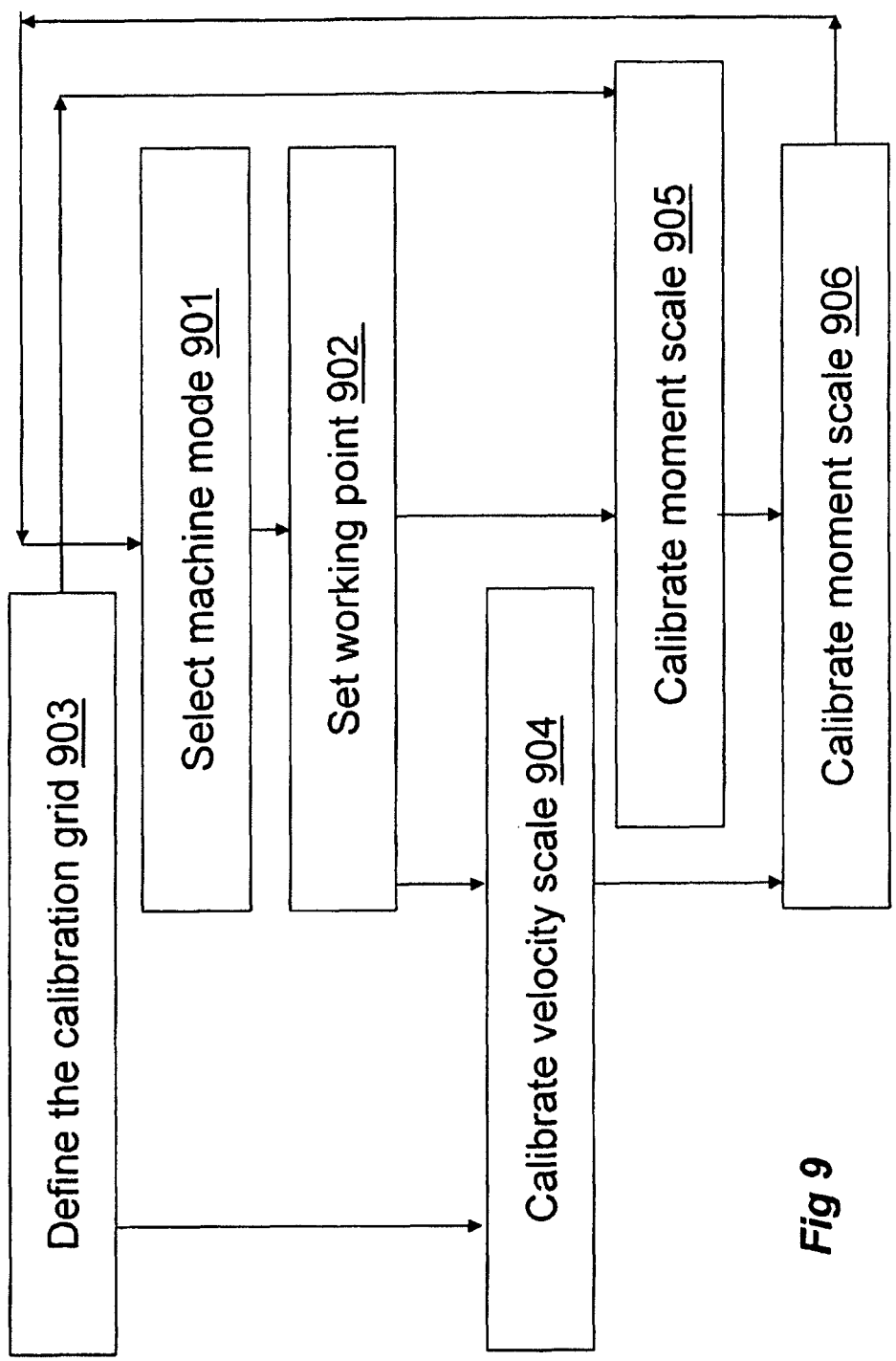
FIG. 9 presents a method of actuator calibration according to an embodiment of the invention.

FIG. 9 illustrates a flow chart of a method for machine calibration, according to an embodiment of the invention. The method is performed prior to system assembly. The system used for machine calibration is shown in FIG. 5. In step 901 machine-controlled mode is selected. The machine can function as a motor or as a generator, so it can be calibrated for positive and negative moment and velocity according to the four quadrants described in FIG. 5. In step 902 the working point from the set available on the curve are selected and in step 903 the calibration grid is defined. The calibration grid is a set of commands sent from the computational device 306 to the controller 101 in order to change the velocity and the moment at the machine shaft 109. The calibration grid can be preset prior to this calibration process, which is why it is shown out of sequence. The number of commands for velocity grid is equal to the number of commands for the moment grid. For example, if calibration is performed in five working points, five current commands set in step 903 are sent to the driver 102, corresponding to currents of, e.g., 1 mA, 2 mA, 3 mA, 4 mA and 5 mA. For each current the velocity without load and moment without motion are measured in steps 904 and 905. This is done by applying an accurate force/moment to the shaft and recording variations from zero velocity. If the current grid defined in 903 includes twenty points, then the steps 904 and 905 are performed with twenty points, etc. Step 904 is the velocity scale calibration. For a calibration grid 903, velocity is measured by external measurement equipment on the machine shaft 109 with constant moment by applying a constant load. Step 905 is the moment scale calibration. For a calibration grid 903, moment is measured by external measurement equipment on the machine shaft 109 with constant velocity. The moment measured by 118 is independent of the internal control loop of 101. In step 906 machine calibration curve 501 is generated. To this end, for each point in calibration grid 903, the relevant velocity and moment value are indicated on the plot. The curves in plot 501 enable operating the controlled machine with input from 306 and output measured on the machine shaft 109. The curves 501 are generated for all relevant machine modes and working points using automated setup system, such as that illustrated in FIG. 5. If the machine is to be operated in a single mode, then only one curve is needed; however, generating several curves provides flexibility in operating the machine in various modes.

Figure 10:
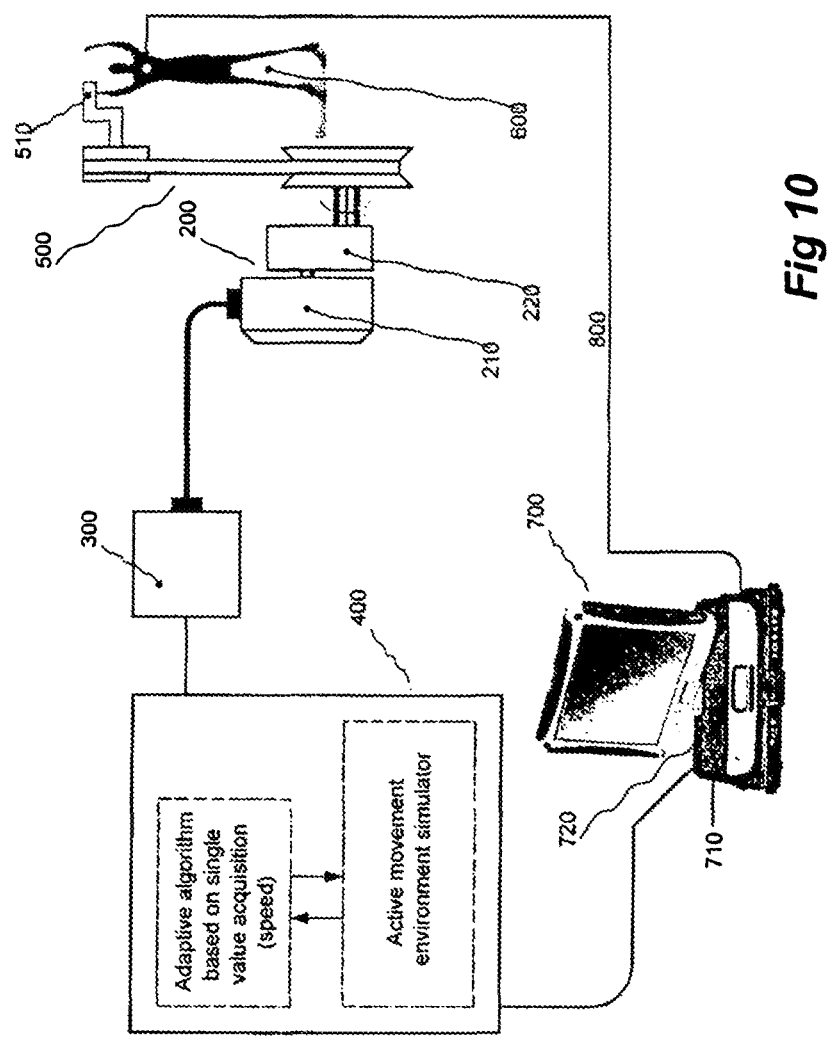
FIG. 10 illustrates a general block diagram of an intelligent dynamic platform as an exemplary use of the present invention.

FIG. 10 illustrates a general block diagram of an intelligent dynamic platform as an exemplary use of the present invention. It is based on an electric machine 210 (e.g., brushless motor with permanent magnets) with compatible driver 300 operating in 4 quadrants (i.e., velocity-moment quadrant shown in plot 501 of FIG. 5) and coupled with a mechanical transmission 220, forming together a 4-quadrant actuator 200. The transmission output is mechanically connected to an ergonomic interface 500 converting the rotation of the transmission 220 to a desirable movement trajectory of mechanical lever 510 deployed at a work point by a user 600. It should be appreciated that alternatively one may consider the interface 500 to be part of the transmission 220, in which case the transmission output is taken to be at the lever 510.

The actuator 200 is managed by a fast-acting controller 400. The controller's core is an active movement environment simulator which makes the actuator 200 supply a desirable movement profile, perceptible by the user 600. The movement at the work point of lever 510 operates according to an adaptive methodology, according to features of the invention.

The adaptive methodology is used for control of the two-parameter (i.e., velocity and moment) dynamic system with unknown behavior. Velocity (speed) sensor signal on the electric machine axel or transmission axel (actuator 200) is detected. A priori information of constant force/moment of the actuator 200 versus velocity is used for force/moment calculation. The adaptive process includes different forms (for different applications) of physical summary of applied force/moment components on the work point, which includes user activity, actuator 200 activity mechanical losses and environment effects. The adaptive process consists of four configurations in accordance with 4-quadrant specifications of the used actuator. The prediction and verification method is used for identification and control of the two-parameter force/velocity system, where velocity values collected from physical sensor with known scale, but force (moment) value at work point is calculated from the physical summary. Scaling of this force/moment value was performed a priori by force measuring in number of platform steady-state positions of different force values.

To provide a pre-running or an instant regulation of the movement forming process, the platform interfaces with a user console 700 providing both comfort information input and instant process monitoring. The console may be optionally connected to external information and control resources through a remote channel 710 (e.g. intranet, internet and the like). Besides it, to improve the results, the user physiological sensing 800, connected to the console 700, may be applied. If the console 700 constitutes a computer unit 720 then the controller 400 may be implemented as a software tool.

Figure 11:
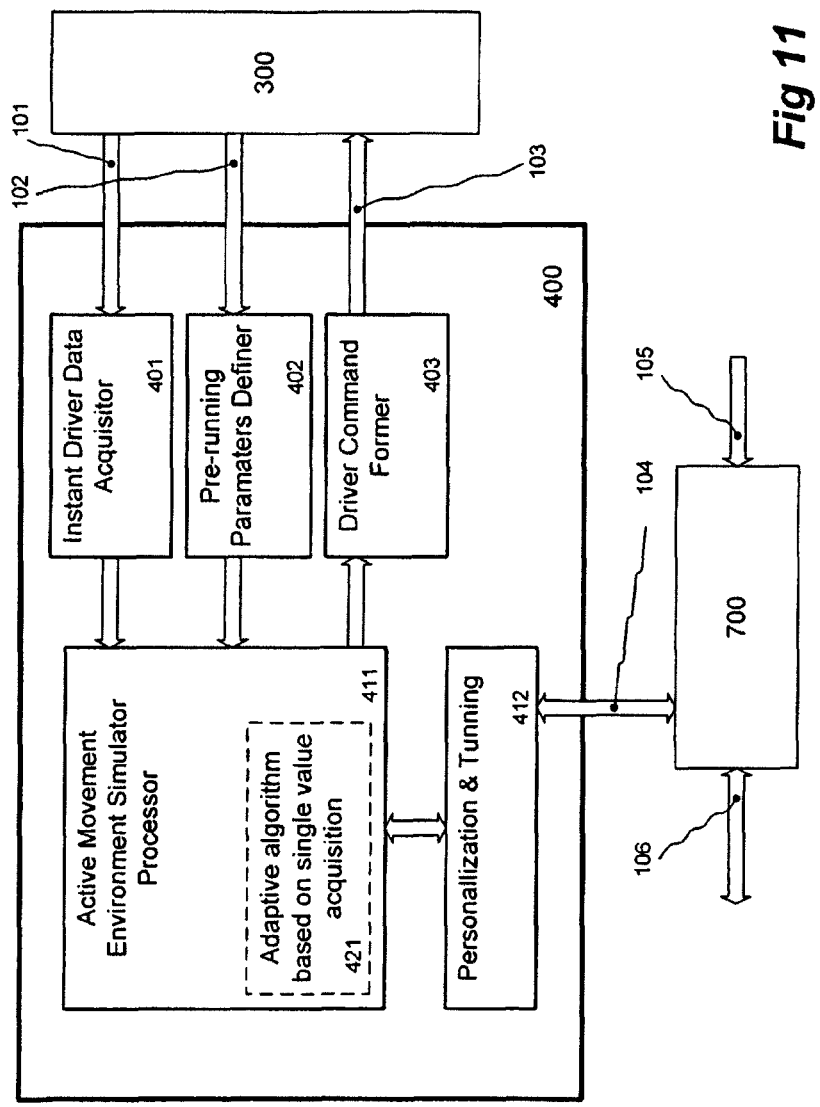
FIG. 11 illustrates an example of a control procedure.

Referring to FIG. 11, an example of a control procedure is illustrated. Prior to each operational session (i.e., re-configuration), the platform without served person action (0 of user activity in two-direction algorithms) is run through specific movement simulation profile. During this pre-running procedure the controller collects the information 102 used to extract an array of the existing characteristics. The platform, environment and user parameters extraction is supported by "Pre-running Parameters Definer" 402 and used for fulfill necessary elements for operation session control.

During operational session the controller instantly receives from the actuator 200 essential movement data 101. It shall include, at least, instant information on speed. The instant data flow 101 is treated in "Instant Driver Data Acquisition" 401.

The console 700 which is used both to pre-set the main platform, environment and user characteristics and to monitor this characteristics, exchanges information 104 with the controller through the "Personalization & Tuning" block 412. (Provided the system is equipped by physiological monitoring infrastructure, there is a data flow 105 from physiological sensors to the console 700. If the system is connected to remote commanders (e.g. virtual training centers) there is a data 106 exchange.

The heart of the controller is "Active Movement Environment Simulator Processor" 411. During pre-running session when there is no influence of a served person activity, the Processor receives through "Pre-running Parameters Definer" 402 the treated driver information and calculates permanent platform parameters to be used in forming mechanical environment during following operational session.

During operational session following the pre-running one, the simulator processor receives through "Instant Driver Data Acquisition" 401 the treated instant driver data. Taking in account the previously calculated permanent platform parameters, Processor 411 using the "Adaptive algorithm" 421 (to be elaborated below) derived from the data all required values.

Figure 12B:
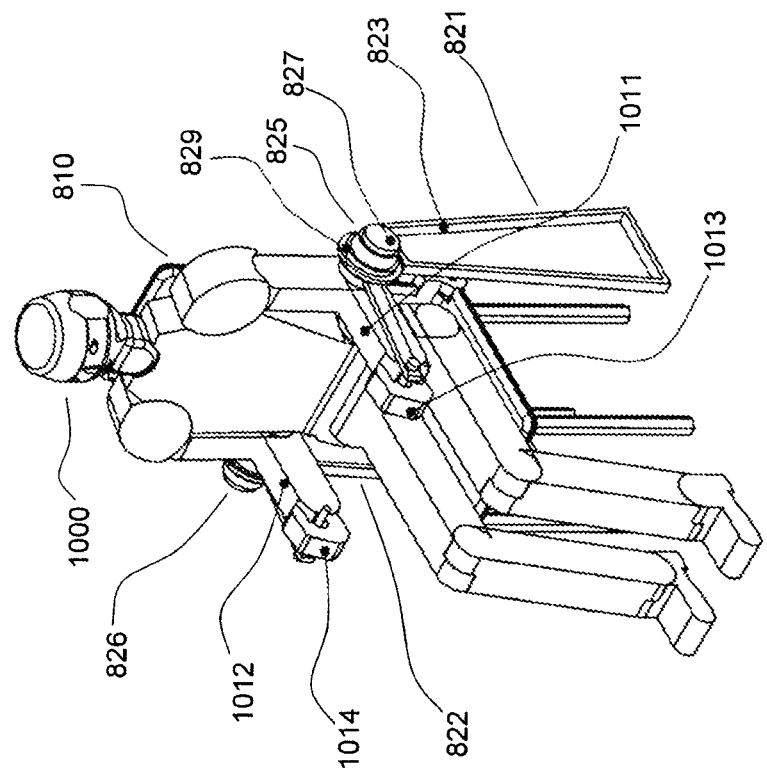
FIGS. 12A and 12B, illustrate non-limiting examples of implementations of the invented dynamic platform.
Figure 12A:
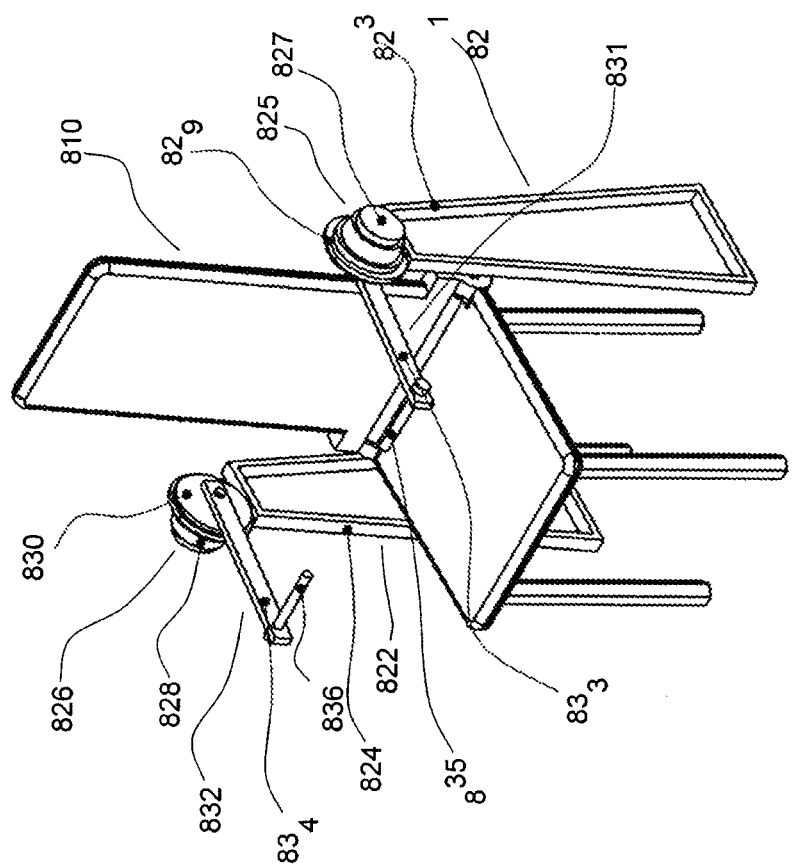

Now referring to FIGS. 12A-14B, a few implementations of the invented dynamic platform are described as non-limiting examples. FIGS. 12A and 12B show the main parts of a "multi-trainer" operated in "biceps training mode". A served person 1000 seats on a chair 810 and holds the ergonomic interface rods 835, 836 by hands 1013, 1014. Two identical user ergonomic interfaces 821, 822 based on stands 823, 824 are attached to the chair 810 from its sides. Actuators 825, 826 consisting of electric machines 827, 828 and mechanical transmissions 829, 830 are mounted on their tops. The final sections 831, 832 of the ergonomic interface are attached to the transmissions outputs. They in turn consist of changeable length levers 833, 834 and rods 835, 836. A served person 1000 is to bend his forearms 1011, 1012 around the actuators axes.

FIGS. 13A and 13B show main parts of a "multi-trainer" operated in "jerk training mode". A served person 1000 lies on a mat 810 and holds the ergonomic interface rods 835, 836 by hands 1013, 1014. Two identical user ergonomic interfaces 821, 822 based on and cradles 843, 844 are attached to the mat 810 from its sides. Actuators 825, 826 consist of electric machines 827, 828 and mechanical transmissions 829, 830. The final sections the ergonomic interface—drums 845, 846 with plane springs 847, 848—are attached transmissions output. A served person 1000 is to rotate the drums through the springs pushing his hands 1013, 1114 by bending his forearms 1011, 1012 and shoulders 1015, 1016.

Figures 14A, 14B:
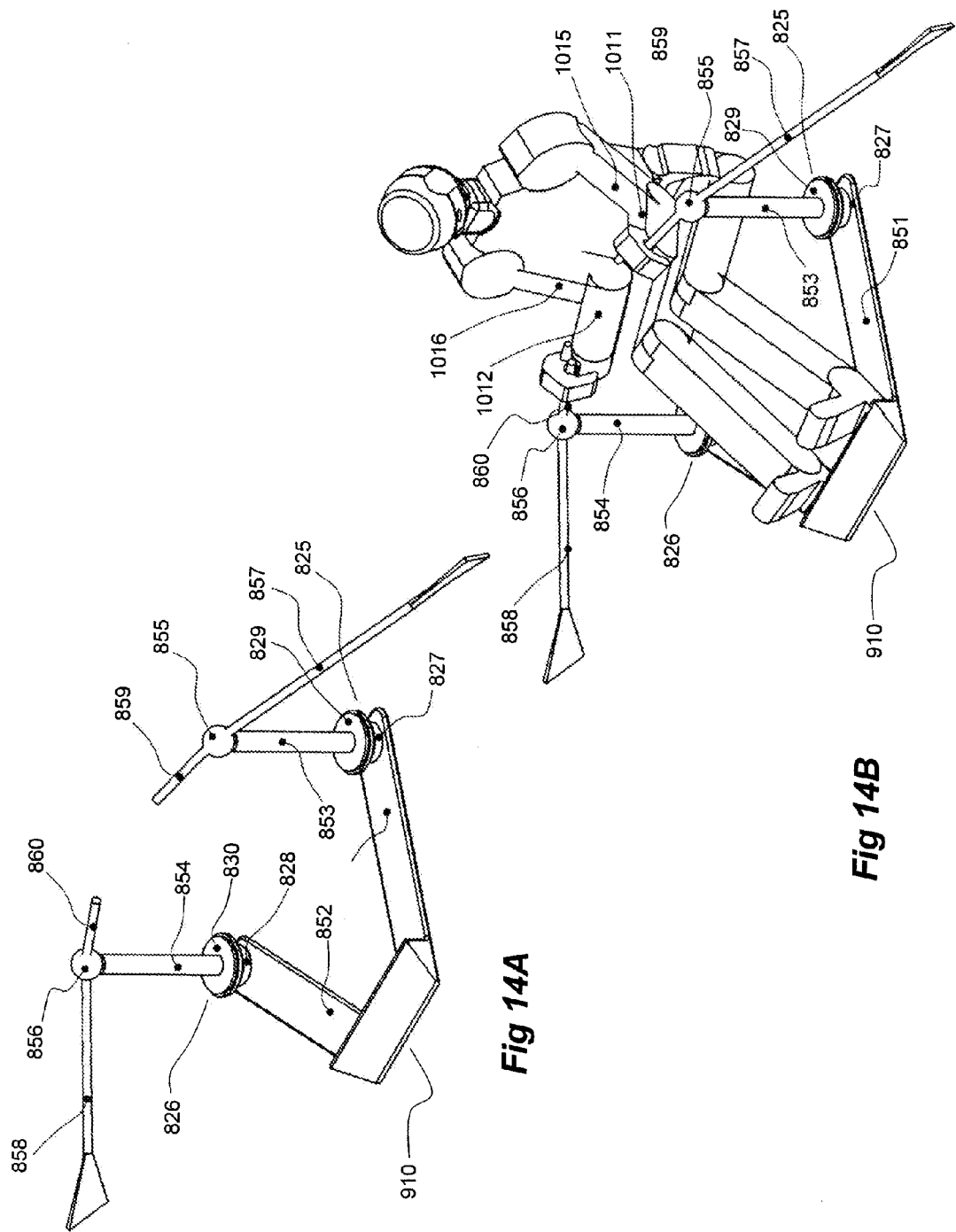
FIGS. 14A and 14B show the main parts of a "multi-trainer" operated in "boat-racing training mode" according to an embodiment of the invention.

FIGS. 14A and 14B show the main parts of a "multi-trainer" operated in "boat-racing training mode". A served person 1000 sits trusting on a boss 910 and holds the ends 859, 860 of oar mock-ups 857, 858. Two identical user ergonomic interfaces are attached to stand 910. The interfaces include pedestals 853, 854 secured to the boss 910 by frames 851, 852, joints 855, 856 and oar mock-ups 857, 858. Actuators 825, 826 consist of electric machines 827, 828 and mechanical transmissions 829, 830. A served person 1000 is to move his forearms 1011, 1012 and shoulders 1015, 1016 simulating the boat-racing movement.

Figure 15B:
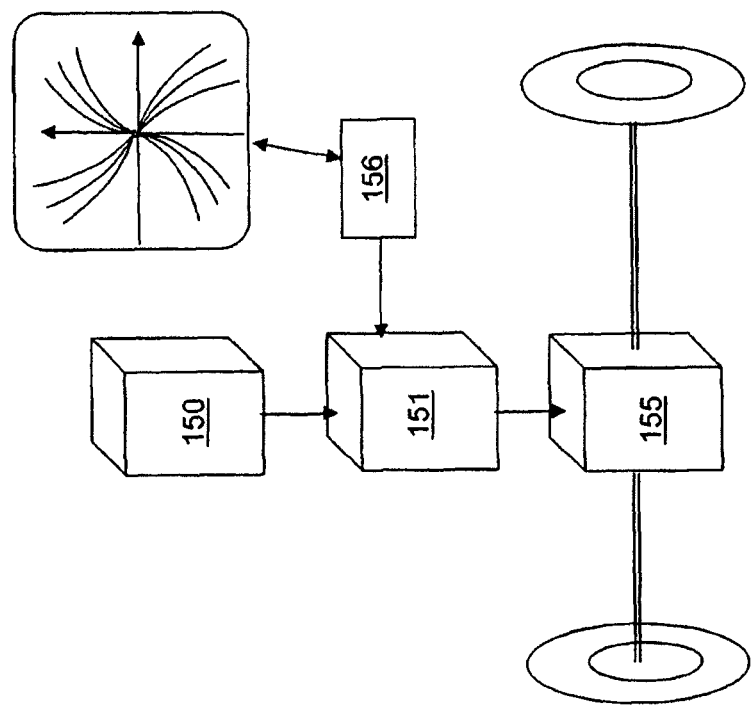
FIG. 15B illustrates an example of an electric car set-up according to an embodiment of the invention.
Figure 15A:
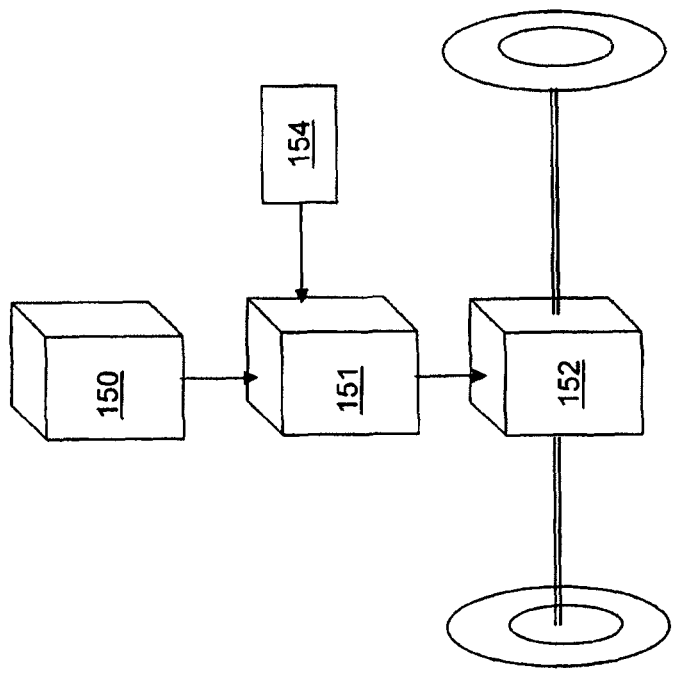

FIG. 15A illustrates an example of a conventional electric car set-up, while FIG. 15B illustrates an example of an electric car set-up according to an embodiment of the invention. In FIG. 15A, energy stored in battery 150 is converted to motive force by electrical motor 151, under the control of the controller 154. The motive force is characterized by velocity and moment, which are transduced by transaxle 152. Transaxle 152 is used in front-wheel drive vehicles and is basically a combination of a transmission and differential used in rear-wheel drive vehicles. The transmission's action enables transducing the velocity-moment output of the motor 151 to a desired combination that generally depends on the driving condition (uphill, downhill, acceleration, etc.) and also changes the orientation of the applied rotational motive force. The differential's action enables each of the wheels to be driven at a different rotational speed (necessary for making turns). As is well known, transmissions and transaxles are heavy and bulky parts which require space and increase the energy required to move the car. On the other hand, differentials are relatively small and inexpensive parts (in simplest form requiring only four interconnected toothed wheels.

FIG. 15B illustrates an electrical car according to an embodiment of the invention. In FIG. 15B, energy from battery 150 is converted to motive force by motor 151, under the control of controller 156. Controller 156 operates according to embodiments of the invention, and switches the operational modes of motor 151 according to velocity-moment curves, such as shown in FIG. 5, according to the driving conditions (uphill, downhill, acceleration, etc.). Consequently, the controller can operate the motor so as to provide the function of both motor and transmission. Therefore, the system of FIG. 15B does not require a transmission or a transaxle. Rather, only a differential 155 is needed, resulting in a smaller, cheaper, and lighter motive system.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the server arts. It is intended that the specification and examples be considered as exemplary only, with a true scope and spirit of the invention being indicated by the following claims.

The invention claimed is:

1. A method of operating an actuator operating on a load, the actuator comprising a machine and a transmission, the machine comprising an energy converter and the transmission comprising a transducer having a transducing ratio, the method comprising:
    measuring machine velocity of the machine shaft;
    using the measured machine velocity to obtain machine moment from pre-established velocity-moment curves;
    calculating the transmission velocity using the machine velocity and transmission ratio;
    calculating the transmission moment using the calculated transmission velocity;
    predicting actual transmission velocity using the internal losses model;
    predicting actual transmission moment using the predicted actual transmission velocity, the internal losses model and external losses model.

2. The method of claim 1, wherein in the step of using the measured machine velocity to obtain machine moment from pre-established velocity-moment curves, values of at least one of machine velocity and machine moment are scaled to correspond to a known set of values of the other within an operational regime.

3. The method of claim 1, wherein the step of predicting actual transmission velocity using the internal losses model comprises:
    using the internal losses model obtained during a pre-operational calibration performed without loading the actuator.

4. The method of claim 1, wherein the step of predicting actual transmission moment using the predicted actual transmission velocity, the internal losses model and external losses model comprises:
    using the external losses model obtained during a pre-operational static load calibration performed with a static load coupled to the output of the transducer.

5. An actuator comprising:
    an energy converter characterized by a first parameter and a second parameter, the first and second parameters being interrelated;
    a sensor coupled to the output of the energy converter and measuring magnitude of the first parameter;
    a transducer being characterized by a transducing ratio;
    a controller comprising:
        a converter calibration module storing curves interrelating the first and second parameters;
        an internal losses model;
        an external losses model;
        a feedback loop receiving the magnitude of the first parameter from the sensor and utilizing the magnitude of the first parameter, transducing ratio, internal losses model and external losses model to calculate control signal to drive the energy converter.

6. The actuator of claim 5, wherein the feedback loop obtains corresponding value of the second parameter by matching the magnitude of the first parameter with the one of the curves.

7. The actuator of claim 5, wherein the feedback loop changes operational mode of the energy converter by selecting a different calibration curve from the converter calibration module.

8. The actuator of claim 5, wherein in the stored curves interrelating the first and second parameters, values of the second parameter are scaled to correspond to a known set of values of the first parameter within an operational regime.

9. The actuator of claim 8, wherein the feedback loop further utilizes the scaled value of the second parameter.

10. The actuator of claim 5, wherein the feedback loop performs the operations:
    using the measured value of the first parameter to obtain current value of the second parameter from the converter calibration module;
    calculating transduced value of the first parameter using the magnitude of the first parameter and the transducing ratio;
    calculating transduced value of the second parameter using the transduced value of the first parameter;
    predicting actual value of the first parameter using the internal losses model obtained during a pre-operational calibration performed without loading the actuator;
    predicting actual value of the transduced value of the second parameter using the actual value of the first parameter, the internal losses model and the external losses model obtained during a pre-operational static load calibration performed with a static load coupled to the output of the transducer.

11. A method for controlling an actuator operating on an arbitrary load, the actuator comprising an energy converter and a transducer, the method comprising:
    performing converter calibration of the energy converter operating independently of the transducer,
    wherein performing the converted calibration further comprises:
        coupling rate and force sensors to the output or the energy converter;
        operating the converter by providing a plurality of activation signals of different values; and,
        constructing rate-force curves characteristic of the energy converter using outputs provided by the rate and force sensors coupled to the energy converter, wherein values of at least one of the rate and the force are scaled to correspond to a known set of values of the other within an operational regime;
    performing actuator calibration of the actuator operating without a load;
    performing static load calibration of the actuator operating with applied static load; and,
    using the converter calibration, actuator calibration, and static load calibration to form a feedback loop to control operation of the actuator on the arbitrary load.

12. The method of claim 11, wherein performing actuator calibration comprises:
    coupling the transducer to the energy converter to thereby form the actuator;
    coupling rate and force sensors to the output of the transducer;
    operating the actuator by providing a plurality of activation signals of different values; and,
    constructing an internal losses model of the actuator using outputs provided by the rate and force sensors coupled to the transducer.

13. The method of claim 11, wherein performing static load calibration comprises:
- coupling a static load to output of the transducer;
- operating the actuator by providing a plurality of activation signals of different values; and,
- obtaining static load calibration to obtain external losses model of the actuator.

14. The method of claim 11, wherein using the converter calibration comprises:
- measuring rate of change at the output of the converter; and,
- using the measured rate of change to obtain converter force from the pre-established rate-force curves.

15. The method of claim 12, wherein using the actuator calibration comprises:
- calculating transducer rate of change using converter rate of change and transducer ratio; and,
- using the actuator calibration to introduce internal losses values to the transducer rate of change.

16. The method of claim 13, wherein using the static load calibration comprises:
- calculating transducer rate of change using converter rate of change and transducer ratio; and,
- using the static load calibration to introduce external losses to the transducer rate of change.

\* \* \* \* \*